United States Patent
Albandakji

(10) Patent No.: US 11,689,974 B2
(45) Date of Patent: *Jun. 27, 2023

(54) AUTOMATED ADDITION AND DELETION OF FREQUENCY RELATIONS IN WIRELESS COMMUNICATION NETWORKS

(71) Applicant: T-Mobile USA, Inc., Bellevue, WA (US)

(72) Inventor: Rachad Albandakji, Irvine, CA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,031

(22) Filed: May 2, 2022

(65) Prior Publication Data

US 2022/0264391 A1 Aug. 18, 2022

Related U.S. Application Data

(63) Continuation of application No. 17/085,543, filed on Oct. 30, 2020, now Pat. No. 11,323,926.

(51) Int. Cl.
| | | |
|---|---|---|
| *H04W 36/00* | (2009.01) | |
| *H04W 24/02* | (2009.01) | |
| *H04W 84/18* | (2009.01) | |

(52) U.S. Cl.
CPC ....... *H04W 36/0072* (2013.01); *H04W 24/02* (2013.01); *H04W 36/0016* (2013.01); *H04W 36/00835* (2018.08); *H04W 84/18* (2013.01)

(58) Field of Classification Search
CPC ........... H04W 24/02; H04W 36/00835; H04W 36/0061; H04W 36/0083; H04W 72/0453
See application file for complete search history.

(56) References Cited

U.S. PATENT DOCUMENTS

| | | |
|---|---|---|
| 9,392,471 B1 | 7/2016 | Thomas |
| 10,966,132 B1 | 3/2021 | Subramaniam |
| 11,323,926 B1 | 5/2022 | Albandakji |
| 2015/0208300 A1 | 7/2015 | McLaughlin |
| 2022/0141729 A1 | 5/2022 | Albandakji |

FOREIGN PATENT DOCUMENTS

WO 2020247644 A1 12/2020

OTHER PUBLICATIONS

Notice of Allowance dated Dec. 30, 2021 for U.S. Appl. No. 17/085,543 (pp. 1-9).

*Primary Examiner* — Nam T Huynh
(74) *Attorney, Agent, or Firm* — Loeb & Loeb LLP

(57) ABSTRACT

A computer-implemented method may include providing, to a cell, a selection of a number of neighboring tiers for selection by the cell. The method also provides a database storing in a first list: frequencies broadcasted from the cell, neighboring co-site cells of the cell, and neighboring cells surrounding the cell for a selected number of tiers. The method provides a database storing defined frequency relations for the cell and frequencies corresponding to the defined frequency relations to provide a second list of frequencies. The second list includes frequencies available for handover to a user equipment in the cell. The method determines if the second list is missing any of the frequencies of the first list. If the determining is positive, the method processes a request to add frequency relations corresponding to the missing frequencies to the defined frequency relations of the cell.

20 Claims, 6 Drawing Sheets

AUTOMATED ADDITION AND DELETION OF FREQUENCY RELATIONS IN WIRELESS COMMUNICATION NETWORKS

TECHNICAL FIELD

Embodiments discussed herein generally relate to methods and systems for automatically adding and deleting frequency relations in cells of wireless communication network via a self-optimizing network (SON).

BACKGROUND

Mobile wireless technology is rapidly evolving and providing improvements in features such as data speeds, voice and video quality, and internet connectivity as the technology progresses through each new generation. A mobile wireless network is divided over land areas called cells each having a cell site which gives coverage to the cell and includes a base station (or eNodeB in LTE networks). Each cell may be divided into cell sectors that share a cell site, and may be surrounded by neighboring cells of the network. Each cell/cell sector may transmit or broadcast at its own designated frequencies in certain frequency bands. In order to improve signal and data speeds, user equipment in each cell/cell sector may shift (or handover) to a frequency within the same cell/cell sector or to a frequency of a co-site cell or a neighboring cell, such as when the original frequency used for a communication or media session becomes congested or when the signal begins to degrade. The handover may allow seamless continuation of the session and may not be felt by the user of the user equipment.

The frequency relations of each cell/cell sector define the frequencies available for handover in each cell/cell sector of the network, and are related to the actual physical frequencies by specific parameters. Without the frequency relations, neighbor relations between the cells required for handover cannot be created by the network either manually by operators or in an automated fashion via automatic neighbor relation (ANR) features of self-optimizing networks (SONs). The frequency relations for each cell of a network may be stored at a database associated with the eNodeB. When the network signal declines at the user equipment in a given cell below a certain threshold, the user equipment begins scanning the available frequencies defined by the frequency relations in the cell in preparation for handover.

However, cells may have missing frequency relations for frequencies available for handover at the cell's location but not defined by frequency relations in the database. Additionally, cells may have frequency relations in the database which are not used for handover or are not present in the cell's area. If a cell is missing frequency relations (for frequencies of different bands of the same cell, or frequencies of co-site cells or neighboring cells), user equipment in the cell may experience performance issues such as connectivity losses, reduced data speeds, access failures, and dropped calls, while the network may experience increased congestion without being able to move user equipment to another frequency when the used frequency becomes congested. Moreover, with frequency relations that are unused, user equipment in the cell may waste unnecessary time scanning these frequencies when searching for a frequency for handover, possibly interfering with its reception or transfer of data.

Thus, there is a need for improved methods and systems for evaluating and updating cell frequency relations to improve mobility between frequencies of the same or different networks, particularly with the deployment and integration of new network generations, such as 5G, into existing network generations.

SUMMARY

Embodiments disclosed herein apply to systems and methods for automating cell frequency relation updates (additions, deletions) via a self-optimizing network (SON) module to support handover and prevent or reduce degradation in wireless network performance. In one embodiment, a computer-implemented method for automated updating of frequency relations for cells of a wireless communication network is disclosed. The method may include receiving a selection of a number of neighboring tiers to evaluate for the frequency relation update, and collecting from a database a first list of frequencies broadcasted by a cell, neighboring co-site cells of the cell, and neighboring cells surrounding the cell for the selected number of tiers. The method may further include collecting, from a database, defined frequency relations for the cell, and obtaining frequencies corresponding to the defined frequency relations to provide a second list of frequencies, wherein the frequencies of the second list are frequencies available for handover to user equipment in the cell. The method may further include comparing the first list and the second list to determine if the second list is missing any of the frequencies of the first list and, if the second list is missing any of the frequencies of the first list, communicating a request to add frequency relations corresponding to the missing frequencies to the defined frequency relations of the cell in the database to provide an updated list of frequencies available for handover within the cell. Additionally, the method may further include repeating the method for a selected number of cells of the wireless communication network during a same frequency relation updating session.

In another embodiment, a system for automatically adding and deleting frequency relations in cells of a wireless communication network is disclosed. The system may include the wireless communication network including a radio access network (RAN), and a self-optimizing network (SON) operating by a computer system in communication with the RAN. The computer system may include a processor, a memory, and an input-output circuit. The processor may be configured according to computer-executable instructions for adding and deleting frequency relations of the cells in the wireless communication network by collecting from a database frequencies broadcasted by a cell, neighboring co-site cells of the cell, and neighboring cells surrounding the cell to provide a first list of frequencies, retrieving from a database parameters for defined frequency relations for the cell, and obtaining a second list of frequencies for the defined frequency relations based on the parameters. The processor may be further configured according to computer-executable instructions for comparing the first list and the second list to determine if the second list is missing any of the frequencies of the first list, and if the second list includes extra frequencies not present in the first list. The processor may be further configured according to computer-executable instructions for communicating a request to add frequency relations corresponding to the missing frequencies to the defined frequency relations of the cell in the database if the second list is missing any of the frequencies of the first list, and communicating a request to delete frequency relations corresponding to the extra frequencies from the defined frequency relations of the cell in the database if the second list includes extra frequencies. Additionally, the processor may be further configured according to computer-executable instructions for performing the addition and/or deletion of frequency relations for a plurality of cells of the wireless communication network during a same frequency relation updating session.

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

DETAILED DESCRIPTION

Figure 1:
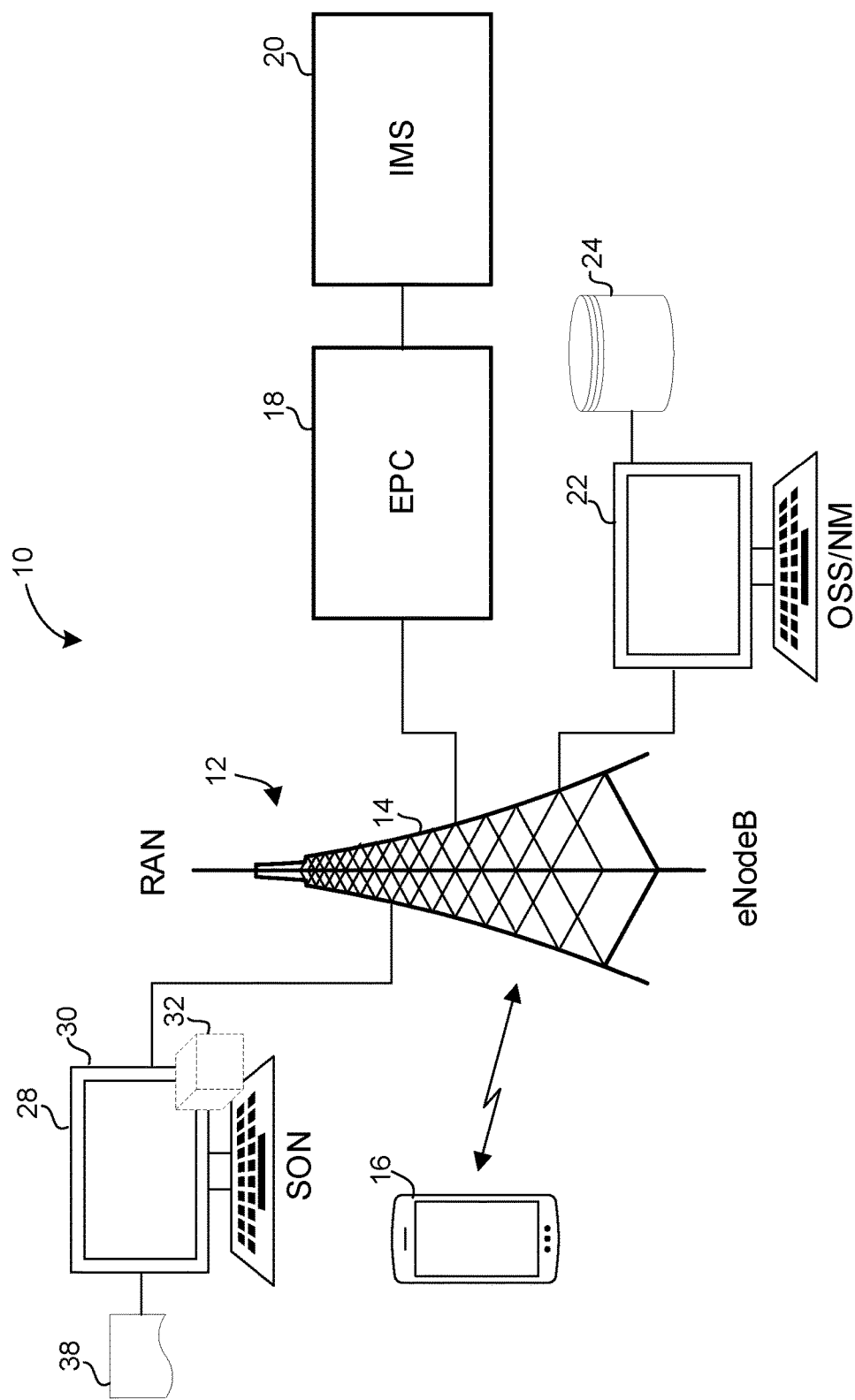
FIG. 1 is a schematic representation of a system including a wireless communication network and a self-optimizing network (SON) for updating frequency relations of the wireless communication network, according to one embodiment.

Referring now to the drawings and with specific reference to FIG. 1, a wireless communication network 10 is shown. In some embodiments, the network 10 may be a 4G Long-Term Evolution (LTE) network or a 5G New Radio (NR) network, such as an Ericsson 4G or 5G network. In other embodiments, the network 10 may be an 4G LTE network integrated with a 5G NR network. In one non-limiting embodiment, the network 10 may include a radio access network (RAN) 12 having base stations 14 (or eNodeBs) for transmitting and receiving wireless signals to and from user equipment (UE) 16, such as smartphones, personal computers, and tablets. An evolved packet core (EPC) 18 may be involved in call set up and authentication, and may connect to an internet protocol (IP) multimedia subsystem (IMS) 20 involved in delivering multimedia communications (voice, video, etc.) over IP networks. The wireless network 10 may further include an operations support system (OSS) or network manager (NM) 22 involved in managing the wireless network. The NM 22 may be in communication with a SON platform database 24 that stores the defined frequency relations for each of the cells 26 (also see FIG. 2) of the network 10. The stored frequency relations may be software objects that represent the actual physical frequencies available to each of the cells 26 for handover, including frequencies within the same cell (or cell sector), neighboring co-site cells, and neighboring cells surrounding each of the cells. The frequency relations may be necessary for building cell relations that represent the neighbors to which the UE 16 can handover.

A self-optimizing network (SON) 28 may include one or more computer systems 30 in connection with the RAN 12. The SON computer system 30 may include one or more SON modules 32 involved in automatically evaluating and updating the frequency relations of the cells of the network 10. In particular, the SON module 32 may automatically add and delete frequency relations for the cells of the network 10 to improve the handover capability of UE 16 in the cells. The frequency relations of numerous cells (e.g., 300 or more) may be updated in the same session via the SON module 32, thereby saving network engineers a tremendous amount of time for the tedious and laborious task of evaluating and adding/deleting cell frequency relations manually. The SON module 32 may be a proactive tool that operates regardless of network performance to prevent degradation in network performance caused by missing or extra frequency relations. In other embodiments, the SON module 32 may be initiated when one or more performance indicators of the wireless communication network falls below a predetermined threshold.

Figure 2:
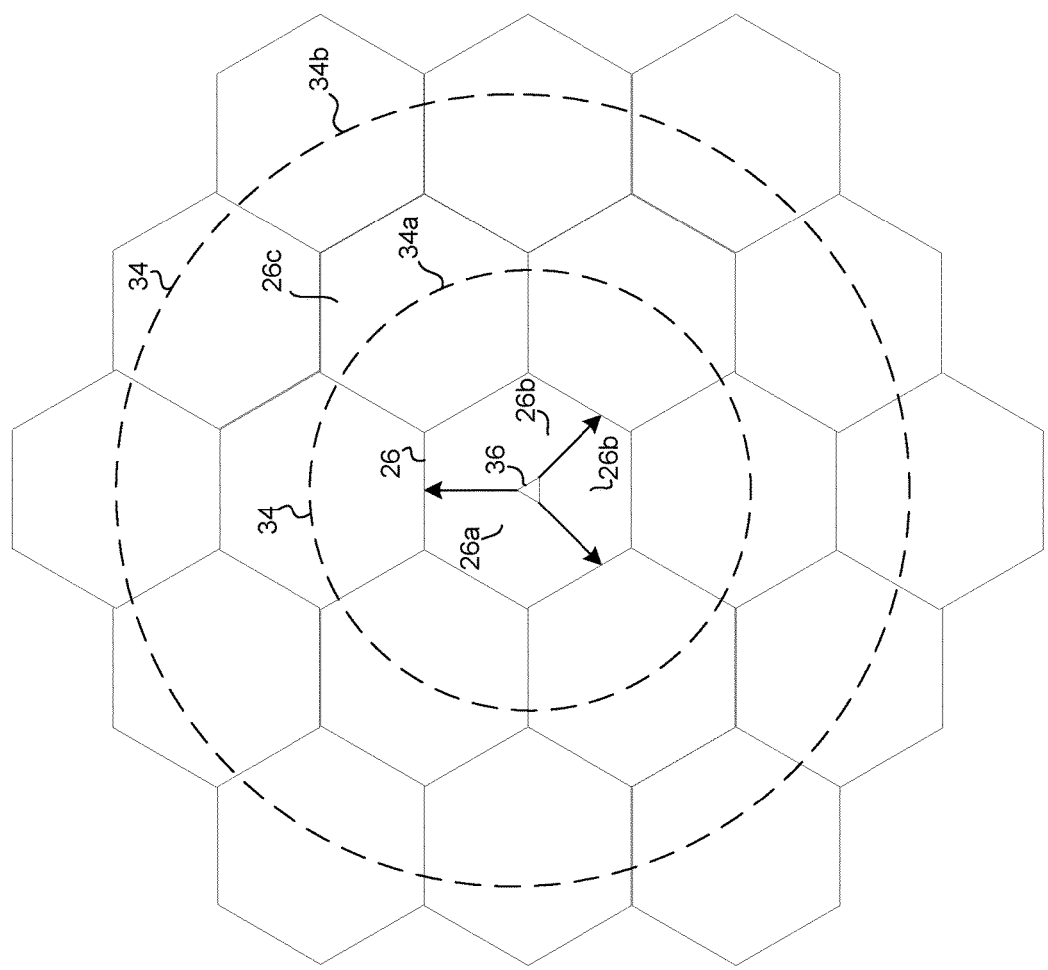
FIG. 2 is a schematic representation of cells of the wireless communication network, according to one embodiment.

FIG. 2 provides a schematic representation of the cells 26 and tiers 34 of the network 10. Each of the cells 26 may include one or more cell sites 36 each including a base station 14 with antennas that may divide the cells 26 into different cell sectors 26a. Hereinafter, "cells" may refer to either cell sectors, or to whole cells if the cells are not divided into sectors. Each of the cell sectors 26a may have neighboring co-site cells 26b which are neighboring cell sectors sharing the same cell site 36, as well as neighboring cells 26c which are cells (or cell sectors) that physically neighbor the cell/cell sector but do not share the same cell site 36. As shown in FIG. 2, a first tier 34a of cells includes the cells surrounding a given cell 26 with coverage overlap, a second tier 34b of cells refers to the cells surrounding the first tier 34a of cells with coverage overlap, and so on.

Figure 3:
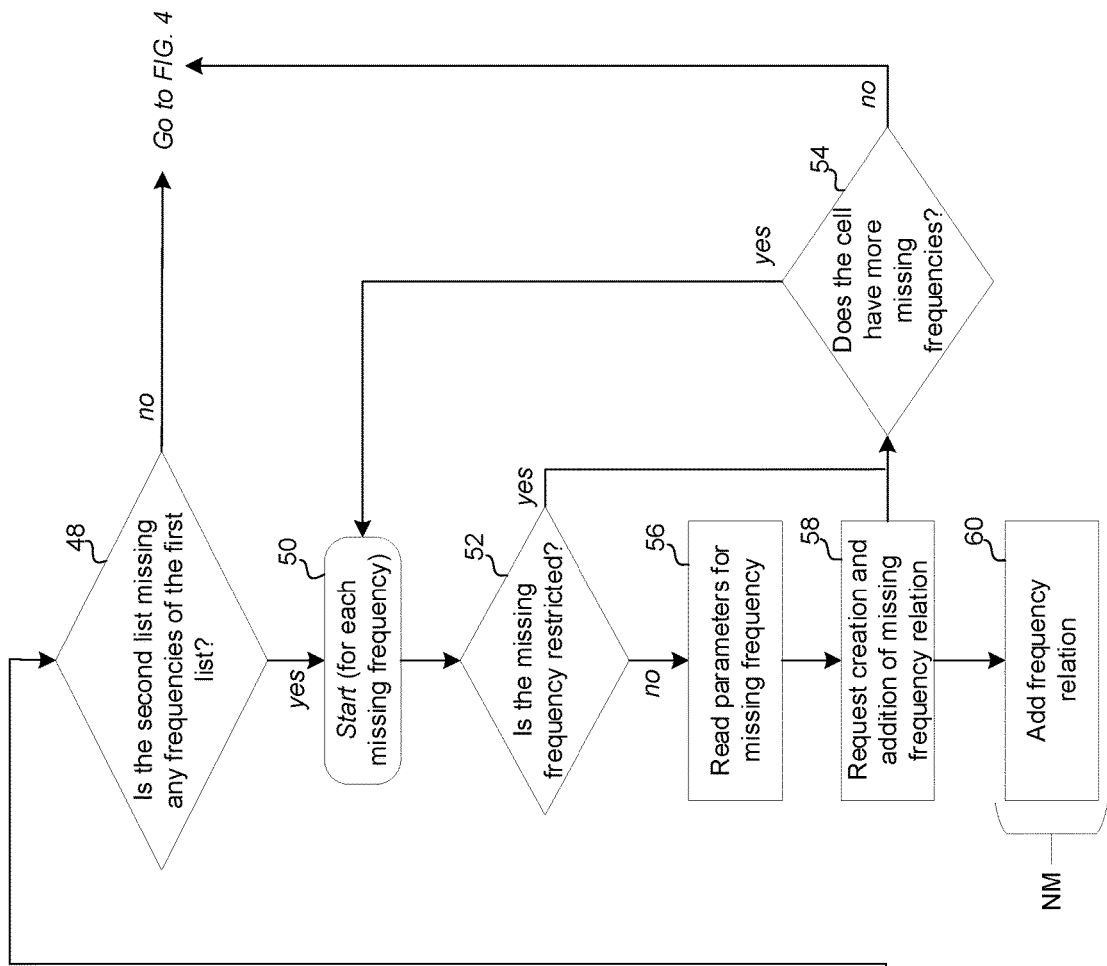
FIG. 3 is a flow chart illustrating an exemplary computer-implemented method for adding missing frequency relations to individual cells of the wireless communication network, according to one embodiment.

Referring to FIG. 3, a method of evaluating a cell (or cell sector) 26 for missing frequency relations and adding any missing frequency relations to the cell 26 via the SON module 32 is shown. The selected number of cells and the number of neighboring tiers used in the evaluation may be received prior to initiation of the method. The method may be initiated at a block 40 for each of a selected number of cells 26 of the network 10. At a block 42, the SON module 32 may collect a first list of frequencies that may include the frequencies broadcasted by the cell 26 (or cell sector 26a) of interest, any neighboring co-site cells 26b of the cell 26, and all neighboring cells 26c surrounding the cell for the selected number of tiers 34. The first list of frequencies may be stored at the SON platform database 24 or another database accessible by the SON module 32. In essence, the first list of frequencies may include all of the frequencies conceivably available to the UE 16 in the cell 26 (or cell sector 26a) for handover based on its location delineated by the selected number of tiers, regardless of whether or not the frequencies are represented by the cell's currently defined frequency relations.

At a next block 44, the SON module 32 may collect the frequency relations that are currently defined for the selected cell 26 (or cell sector 26a). The block 44 may involve retrieving the currently defined frequency relations of the cell 26 from the SON platform database 24, and reading parameters related to the actual physical frequencies contained within the frequency relations. Based on the parameters, the SON module 32 may obtain the actual physical frequencies that correspond with each of the frequency relations to provide a second list of frequencies (block 46). The second list of frequencies may represent the frequencies that are currently available to the UE 16 of the selected cell 26 (or cell sector 26*a*) for handover. These frequencies may be frequencies within one or different frequency bands of the same cell 26 (or cell sector 26*a*), frequencies of neighboring co-site cells 26*b*, and/or frequencies of neighboring cells 26*c* surrounding the cell or cell sector. The second list of frequencies may be stored at the SON platform database 24 or another database accessible by the SON module 32 (block 46).

The first list and the second list may be compared at a block 48 to determine if the second list is missing any of the frequencies of the first list indicating that the cell 26 (or cell sector 26*a*) has frequencies available in its location for handover that are not currently defined by its frequency relations. If the second list is not missing any of the frequencies of the first list, the SON module 32 may evaluate the cell for extra frequencies according to the method of FIG. 4 (see below). If the second list is missing any of the frequencies of the first list, a process for adding a frequency relation to the cell 26 for each of the missing frequencies may be initiated at a block 50. At a block 52, the SON module 32 may determine whether the missing frequency is restricted by the network 10 from being added to the cell's frequency relations. If the frequency is restricted, the SON module 32 may revert to the block 50 to start the process on the next missing frequency if the cell has more missing frequencies as determined at the block 54. If not restricted, the SON module 32 may read parameters required to create the corresponding frequency relation from a configuration file 38 (block 56; also see FIG. 1), and communicate a request to the NM 22 to create and add a frequency relation corresponding to the missing frequency to the cell 26 (block 58). The request may include the parameters read from the configuration file 38 which enables the NM 22 to build and add the missing frequency relation to the cell (block 60). The addition of the frequency relation allows the NM 22 to build the neighbor relations required for handover to the missing frequency. If the cell has more missing frequencies (as determined at the block 54), the module 32 may go to the block 50 and initiate the process of adding the missing frequency relations for each of the missing frequencies, thereby expanding and updating the list of frequencies available to UE 16 in the cell 26 for handover. When the SON module 32 has completed the process for all of the missing frequencies of the cell 26, it may evaluate the cell 26 for extra frequencies according to the method of FIG. 4 (see below).

Figure 4:
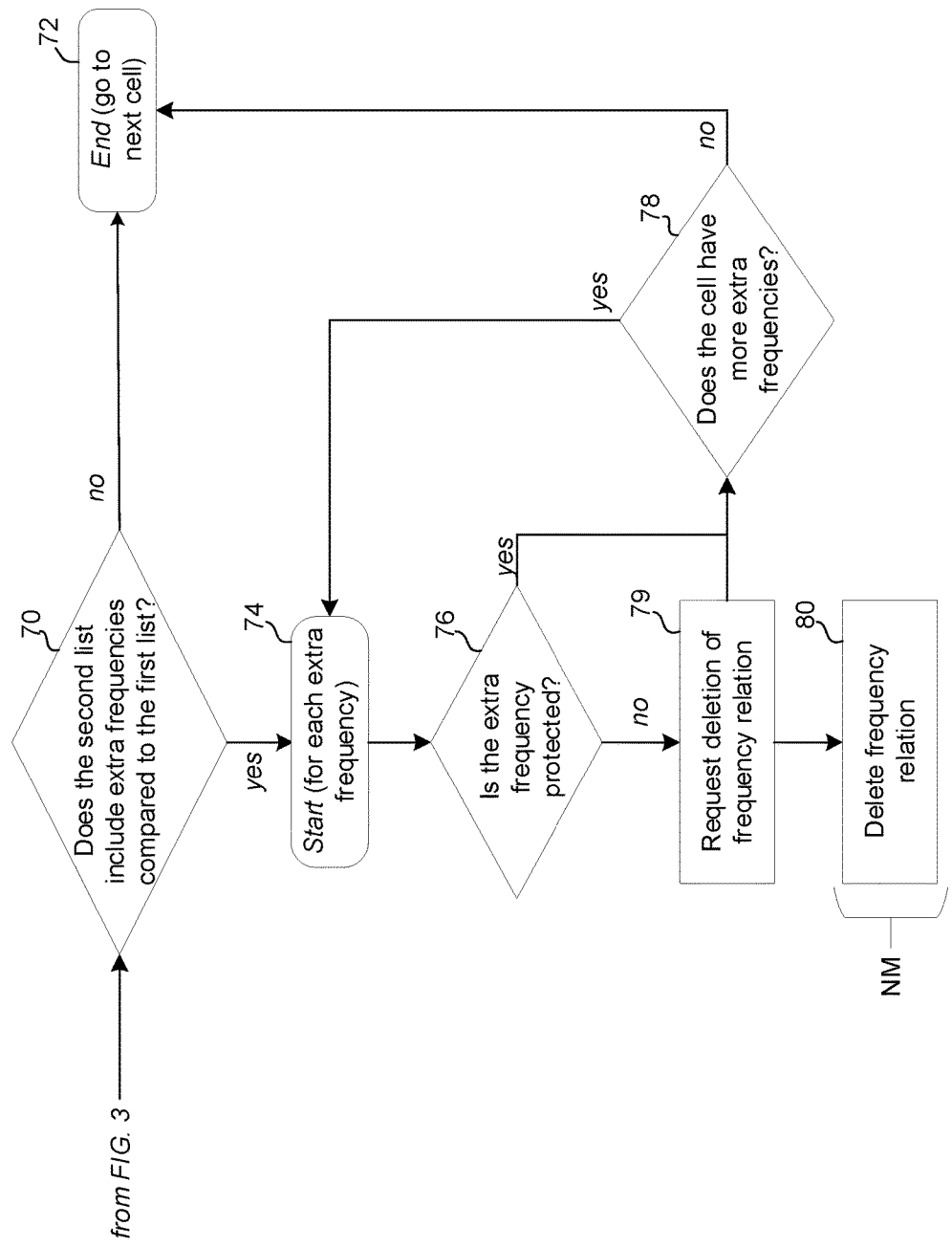
FIG. 4 is a flow chart illustrating an exemplary computer-implemented method for deleting frequency relations from individual cells of the wireless communication network, according to one embodiment.

A method of evaluating the cell 26 for extra, unused frequency relations and deleting any extra, unused frequency relations via the SON module 32 is shown in FIG. 4. The method of FIG. 4 is a continuation of the method FIG. 3 carried out after collecting and storing the first and second lists of frequencies. The methods of adding missing frequency relations (FIG. 3, right side) and deleting extra frequency relations (FIG. 4) may be carried out sequentially, simultaneously, in different orders, or at different times.

At a block 70, the SON module 32 may compare the first list and the second list to determine if the second list includes extra frequencies not present in the first list. These extra frequencies may be frequencies represented by frequency relations defined in the cell 26, but are not existing in the cell's area (delineated according to the selected number of tiers). For example, the extra frequencies may be old frequencies for the cell 26 that were not removed by routine clean up protocols. As such, the UE 16 in the cell 26 may spend unnecessary time scanning these frequencies when searching for the best frequency for handover. If the cell 26 does not have extra frequencies, the module 32 may go to the next cell and repeat the methods of FIGS. 3-4 to address any missing or extra frequency relations of the next cell as needed (block 72).

If the cell 26 does have extra frequencies, the SON module 32 may initiate a process for deletion of each of the extra frequencies at a block 74. For a given extra frequency, the SON module 32 may first determine whether or not the extra frequency is protected (or forbidden from deletion) by the network 10 (block 76). Certain frequencies may be forbidden from deletion, for example, if network engineers expect that the frequencies may be used in new frequency bands in the future as the network is built and upgraded. If the extra frequency is protected, the SON module 32 may revert to the block 74 and initiate the process on the next frequency if the cell 26 has more extra frequencies (as determined at a block 78). If the extra frequency is not protected, the SON module 32 may communicate a request to the NM 22 to delete the frequency relation corresponding to the extra frequency (block 79), and the NM 22 may subsequently delete the frequency relation (block 80). If the cell 26 has additional extra frequency relations (as determined at the block 78), the SON module 32 may go to the block 74 to initiate deletion of the next extra frequency. When the SON module 32 has addressed all of the extra frequencies in this way, the SON module 32 may go to the next cell and repeat the methods of FIGS. 3-4 to address any missing or extra frequency relations of the next cell as needed. It is noted that the steps of the methods of FIGS. 3-4 are merely exemplary, and may be performed in different orders in practice.

The above methods may be repeated for each of the selected number of cells to correct and update the frequency relations as needed. The updated frequencies (represented by the updated frequency relations) may be broadcast to the UE 16 of each cell 26 to allow the UE 16 to scan the frequencies for handover. If the network 10 is an LTE network, the updated frequencies may represent frequencies available for handover within the LTE network, or to a NR 5G network if the NR network is integrated with the LTE network. Likewise, if the network is a NR 5G network, the updated frequencies may represent frequencies available for handover within the NR 5G network, or to an LTE network if the LTE network is integrated with the NR 5G network.

In some embodiments, the addition and/or deletion of the frequency relations as described above may be carried out via the SON module 32 sequentially on each of the cells in the same updating session. As used herein, an updating session is the time period during which a frequency relation update process (additions/deletions as described above in relation to FIGS. 3-4) is carried out by the SON module 32. In other embodiments, multiple cells may be processed simultaneously during the updating session. Additionally, the above-described methods may be carried out via the SON module 32 in closed loop mode whereby the requests for adding or deleting frequency relations are continuously communicated to the NM 22 without a need for intervention by a network operator. Running the SON module 32 in closed loop mode may speed up the correction of any missing and/or extra frequency relations, and prevent any network performance issues that may result from missing and/or extra frequency relations.

In some embodiments, the above-described methods may be carried out automatically on a one-time basis via the SON module 32 to prevent network performance issues experienced by the UEs 16. In other embodiments, the methods may be carried out continuously or periodically according to settings of a scheduler associated with the SON module 32. In yet other embodiments, the methods may be initiated via the SON module 32 when one or more performance indicators of the network 10 (e.g., dropped call rates, data speeds, congestion etc.) falls below a predetermined threshold. In yet other embodiments, the updates may be performed dynamically based on changes in one or more network performance indicators.

Figure 5:
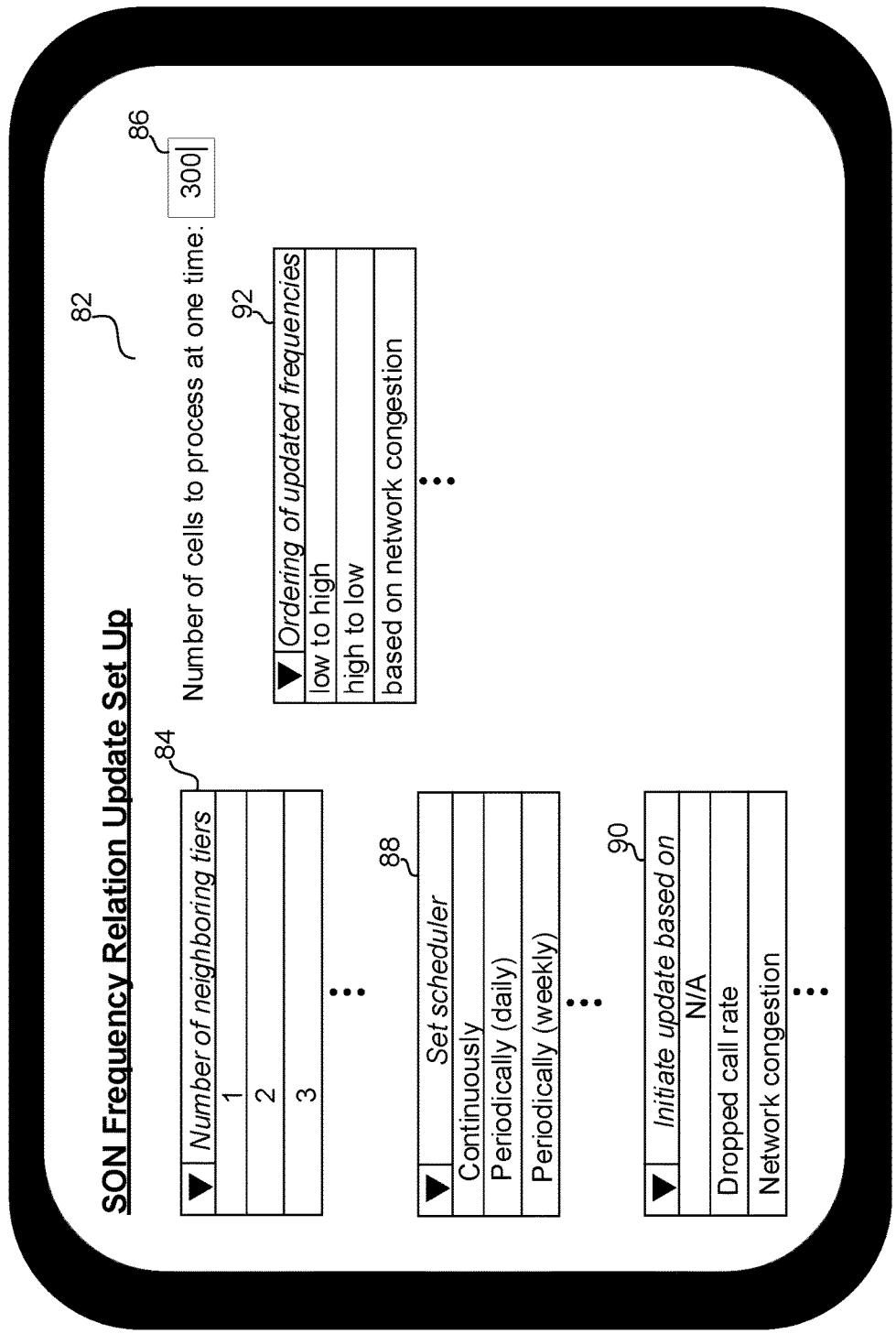
FIG. 5 is an exemplary user interface for setting preferences for updating the frequency relations via the SON, according to one embodiment.

Turning now to FIG. 5, an exemplary user interface 82 for setting up and customizing the SON-mediated cell frequency relation updates is shown. The user interface 82 may be accessed by a computer system associated with the wireless network 10. The user interface 82 may be used by network engineers or operators, for example, to input preferences for the frequency relation update. The user interface 82 may have a region 84 for selecting or inputting a number of neighboring tiers (e.g., 1 to 10) used in the update. In some embodiments, the SON module 32 may default to 1 neighboring tier if not otherwise changed by a network operator. The user interface 82 may also include a region 86 for inputting or selecting a number of cells of the network 10 to process in the frequency relation update, with the SON module 32 being capable of processing hundreds or thousands of cells in one updating session. In some embodiments, the SON module 32 may default to processing 300 cells (or another number of cells) in each frequency relation update if not otherwise changed by a network operator. A region 88 may also be provided for setting the scheduler of the SON module 32. For example, a network operator may select one time, continuous, or periodic updates. Through the interface 82, the operator may specify a frequency for periodic updates (daily, weekly, monthly, etc.) including a specific time of day for the updates. The operator may also select at a region 90 to have the updates triggered based on one or more triggering events, such as a performance indicator of the network 10 (e.g., random access channel failure, dropped call rate, etc.) rising or falling below a threshold. The user interface 82 may also provide a region for inputting the threshold for the performance indicator. The frequency relation update may be set up to be carried out one time upon occurrence of the triggering event, or dynamically each time a triggering event occurs in the network 10. As one non-limiting example, the SON module 32 may be set up to dynamically update the cell frequency relations of the network 10 as dropped call rates in the network rise above a threshold.

Furthermore, the user interface 82 may have one or more regions 92 allowing an operator to select a preference for ordering or ranking the updated frequencies that are sent to the UE 16. The ranked frequencies may facilitate selection of the best frequency for handover at the UE 16, and achieve certain desired results such as improved battery life. For example, the updated frequencies may be ranked from lowest to highest frequency, or from highest to lowest frequency. The operator may have the frequencies ranked from lowest to highest frequency, for example, to conserve battery power at the UE 16, as higher frequencies may use more battery power. As another non-limiting example, the operator may select that the frequencies be ordered or ranked based on certain parameters, such as network congestion, as certain frequencies may be more congested at certain periods of time (frequencies with less congestion may be ranked higher). Along these lines, the network operator may select to have the order of the frequencies dynamically re-ordered as selected network parameters (e.g., congestion, signal level, etc.) fluctuate with time. It will be understood that the user interface 82 of FIG. 5 is merely exemplary, and may have a different appearance in practice. For instance, instead of drop down menus, the user interface may have regions for typing in setting preferences. Furthermore, there may be several separate user interfaces that allow customization of the frequency relation update settings.

Figure 6:
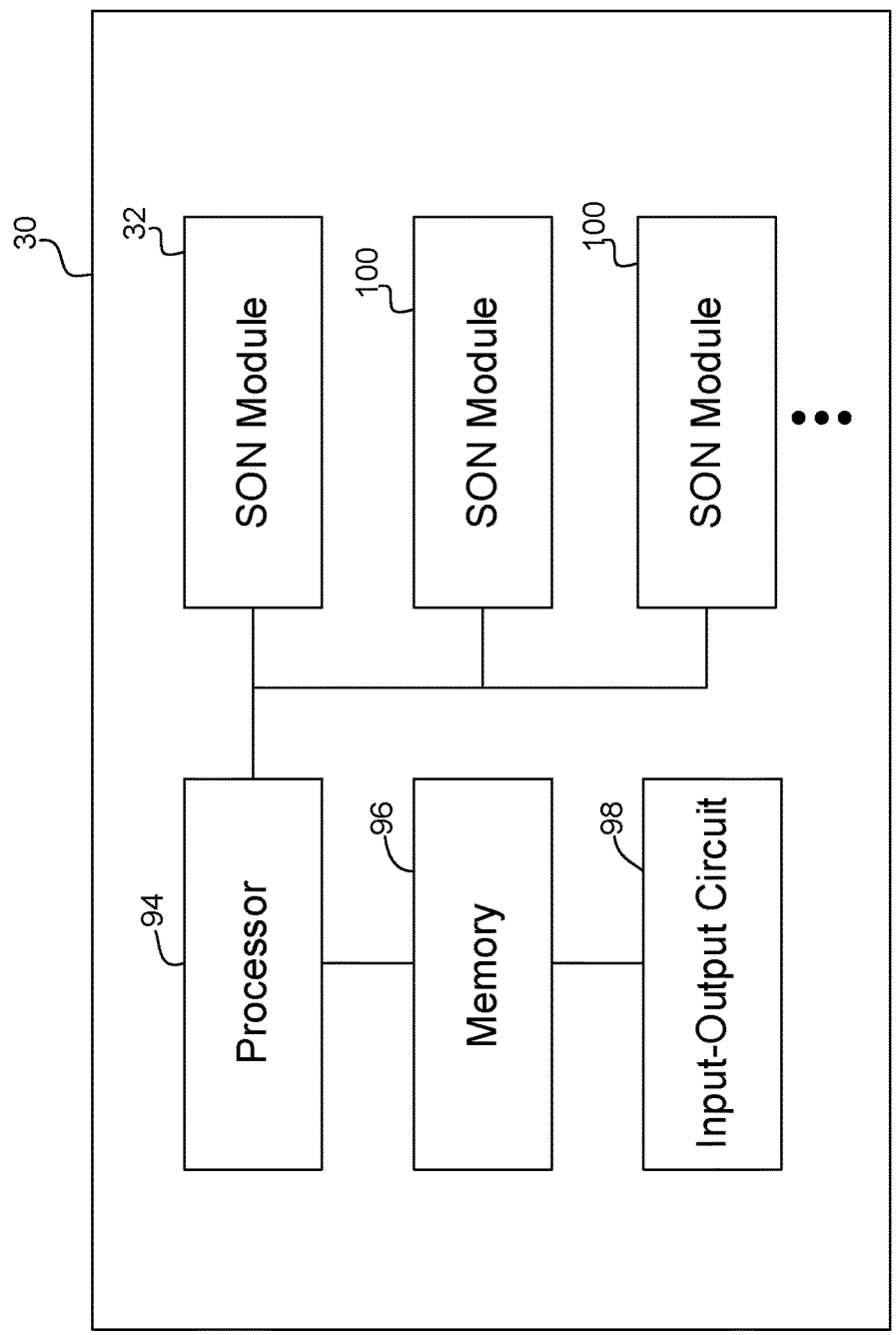
FIG. 6 is a schematic representation of components of a SON computer system, according to one embodiment.

Certain components of the SON computer system 30 are schematically depicted in FIG. 6. The computer system 30 may include a processor 94 configured to perform computer-executable instructions, a memory 96 configured to store the instructions and assist the processor 94, and an input-output circuit 98 involved in communication with components of the wireless network 10 including the NM 22 and the SON platform database 24. The processor 94 may include computer-executable instructions for operating the SON module 32, as well as various other SON modules 100 involved in other aspects of automated optimization and management of the wireless network 10 as will be appreciated by those skilled in the art.

The SON module of the present disclosure provides new functionality to the SON computer system and improves the ability of the SON computer system to manage and optimize the wireless communication network. The SON module accelerates and automates the addition of missing frequency relations and the deletion of extra frequency relations, and is capable processing hundreds or thousands of cells in vastly shorter time period that can be achieved manually. This saves network engineers a tremendous amount of time and labor involved in performing the frequency relation updates manually. The SON module may be a proactive tool that prevents network performance degradation caused by missing or extra cell frequency relations which may be overlooked by network engineers. With the updated frequency relations provided by the features of the SON module, Automatic Neighbor Relation (ANR) functions of the SON can build the neighbor relations needed for seamless handover from one frequency to another, improving network performance in terms of dropped call rates, handover success rates, data speeds, and congestion, among others. The above functions of the new SON module may also be invaluable for enabling mobility between current networks and higher generation networks, including the deployment and integration of 5G networks into existing LTE networks.

What is claimed is:

1. A computer-implemented method for automated updating of frequency relations for cells of a wireless communication network comprising:
   (1) providing, to a cell, a selection of a number of neighboring tiers for selection by the cell;
   (2) providing a database storing one of the following in a first list: frequencies broadcasted from the cell, neighboring co-site cells of the cell, and neighboring cells surrounding the cell for a selected number of tiers;
   (3) providing a database storing defined frequency relations for the cell;
   (4) providing frequencies corresponding to the defined frequency relations to provide a second list of frequencies, wherein the frequencies of the second list being frequencies available for handover to a user equipment in the cell;
   (5) determining if the second list is missing any of the frequencies of the first list;
   (6) if the determining is positive, processing a request to add frequency relations corresponding to the missing frequencies to the defined frequency relations of the cell in the database;

(7) providing an updated list of frequencies available for handover within the cell; and (8) repeating steps (1) to (7) for a selected number of cells of the wireless communication network during a same frequency relation updating session.

2. The computer-implemented method of claim 1, wherein the selected number of cells is at least 300.

3. The computer-implemented method of claim 1, wherein the computer-implemented method is performed in a closed loop mode, and further comprising continuously adding frequency relations before communicating to a network manager without an operator intervention in the closed loop mode.

4. The computer-implemented method of claim 1, further comprising:
   determining if the second list includes extra frequencies not present in the first list; and
   if the determining is positive, processing a request to delete frequency relations corresponding to the extra frequencies from the defined frequency relations of the cell in the database.

5. The computer-implemented method of claim 1, wherein the selected number of neighboring tiers is between 1 and 10.

6. The computer-implemented method of claim 1, further comprising executing a self-optimizing network (SON) module associated with the wireless communication network to process the steps (1) to (8).

7. The computer-implemented method of claim 6, wherein the SON module is configured to process the steps (1) to (8) periodically according to settings of a scheduler associated therewith.

8. The computer-implemented method of claim 6, wherein the SON module is configured to process the steps (1) to (8) in response to a performance indicator of the wireless communication network falls below a threshold.

9. The computer-implemented method of claim 1, wherein the wireless communication network is a long-term evolution (LTE) network, and wherein the updated list of frequencies includes frequencies available for handover within the LTE network and to a new radio (NR) 5G network.

10. The computer-implemented method of claim 1, wherein the wireless communication network is a new radio (NR) 5G network, and wherein the updated list of frequencies includes frequencies available for handover within the NR 5G network and to a long-term evolution (LTE) network.

11. A system for automatically adding and deleting frequency relations in cells of a wireless communication network comprising:
   the wireless communication network including a radio access network (RAN);
   a self-optimizing network (SON) operated by a computer system in communication with the RAN, the computer system including a processor, a memory, and an input-output circuit, the processor being configured according to computer-executable instructions for adding and deleting frequency relations of the cells in the wireless communication network by:
      providing a first database storing a first list of frequencies broadcasted from a cell, wherein the first list further comprises neighboring co-site cells of the cell, and neighboring cells surrounding the cell;
      providing a second database storing defined frequency relations for the cell;
      providing frequencies corresponding to the defined frequency relations to provide a second list of frequencies, wherein the frequencies of the second list being frequencies available for handover to a user equipment in the cell;
      determining if the second list is missing any of the frequencies of the first list;
      if the determining is positive, processing a request to add frequency relations corresponding to the missing frequencies to the defined frequency relations of the cell in the second database in a same frequency relation updating session;
      determining if the second list includes extra frequencies; and
      if the determining is positive, processing a request to delete frequency relations corresponding to the extra frequencies from the defined frequency relations of the cell in the second database in the same frequency relation updating session.

12. The system of claim 11, wherein a number of the cells includes at least 300.

13. The system of claim 11, wherein the processor is further configured according to computer-executable instructions for initiating the process to add or the process to delete the frequency relations dynamically based on a performance indicator of the wireless communication network falling below a threshold.

14. The system of claim 11, wherein the processor is further configured according to computer-executable instructions for ranking the frequencies available for handover to the cell after the process to add or the process to delete the frequency relations based on network congestion at a given point in time.

15. The system of claim 11, wherein the processor is further configured according to computer-executable instructions for ranking the frequencies available for handover based on which frequencies use more battery power at the user equipment.

16. The system of claim 11, wherein the wireless communication network is a 4G network, and wherein the frequencies available to the cell for handover include frequencies of both the 4G network and a 5G network.

17. The system of claim 11, wherein the wireless communication network is a 5G network, and wherein the frequencies available to the cell for handover include frequencies of both the 5G network and a 4G network.

18. The system of claim 11, wherein the processor is further configured according to computer-executable instructions for the process to add or the process to delete frequency relations in a closed loop mode whereby the requests to add or to delete the frequency relations are continuously processed at a network manager without intervention by a network operator.

19. A computer-implemented method for automatically adding or deleting frequency relations in cells of a wireless communication network comprising:
   providing a first database storing a first list of frequencies broadcasted from a cell, wherein the first list further comprises neighboring co-site cells of the cell, and neighboring cells surrounding the cell;
   providing a second database storing defined frequency relations for the cell;
   providing frequencies corresponding to the defined frequency relations to provide a second list of frequencies, wherein the frequencies of the second list being frequencies available for handover to a user equipment in the cell;
   determining if the second list is missing any of the frequencies of the first list;

if the determining is positive, further determining if any of the missing frequencies are restricted from being added to the defined frequency relations of the cell;

adding frequency relations corresponding to the missing frequencies to the defined frequency relations of the cell for each of the missing frequencies that are not restricted from being added to the defined frequency relations of the cell;

determining if the second list includes extra frequencies, wherein the extra frequencies are protected from being deleted from the defined frequency relations of the cell; and if the determining is positive, deleting frequency relations corresponding to the extra frequencies from the defined frequency relations of the cell for each of the extra frequencies that are not protected from being deleted from the defined frequency relations of the cell.

20. The computer-implemented method of claim 19, wherein the method is performed for at least 300 cells in a same frequency relation updating session in a closed loop mode whereby the adding and deleting the frequency relations without input from a network operator.

* * * * *